Patented Oct. 29, 1940

2,219,287

UNITED STATES PATENT OFFICE 2,219,287

INSECTICIDE AND PROCESS OF MAKING THE SAME

Robert B. Arnold, Stonewall Courts, Va., assignor to Tobacco By-Products and Chemical Corporation, Louisville, Ky., a corporation of Delaware No Drawing. Application January 22, 1938,
Serial No. 186,301

14 Claims. (Cl. 167—33)

This invention relates to an alkaloidal insecticide spray, to a composition of matter for making the same, and to a process of making such composition.

The object of the invention is to provide a highly efficient insecticidal spray utilizing the toxic properties of the normally volatile alkaloids, such as anabasine, nornicotine, and nicotine, such spray when applied to plants giving a relatively durable deposit which will serve as a stomach poison and thereby protect the sprayed plants against chewing insects, while at the same time having insect-repelling properties, and sufficient value as a contact poison to be lethal to sucking insects struck by the spray, yet after a reasonable time losing its poisonous properties, so that the residue remaining on fruit, vegetables or grass is non-poisonous.

It has been known that nicotine, nornicotine and anabasine respectively will enter into chemical combination with certain compounds having base-exchange properties, the nicotine or similar alkaloid exchanging place with the base, such as sodium, potassium, calcium or magnesium in such base-exchanging compounds. These base-exchanging compounds are complex salts of alumino or ferro polysilicic acid, containing alkali or alkaline earth metals, so bound to the alumino or ferro polysilicate that said metals may be replaced by an alkaloid under certain conditions.

The characteristics of the resulting alkaloid-polysilicate combination vary materially with the nature of the polysilicate used. With some polysilicates the union with the alkaloid is so durable that the alkaloid will be retained, even when the compound is subjected to water or to an acid solution, but will be set free when the compound is subjected to an alkaline solution of sufficient concentration and under the proper conditions. With other polysilicates, the alkaloid such as nicotine, nornicotine, or anabasine, is not so firmly held and will be removed either wholly or in part by a weakly acid solution, or even by ordinary water having the usual small amount of free hydrogen ions, the reaction in the latter case being slower, but progressive. In this latter case the alkaloid may be held by adsorption rather than by true base-exchange.

It will be seen that, by the proper selection of the alumino or ferro polysilicate as a starting material, widely different insecticidal products may be produced for different uses. Those polysilicate combinations of volatile alkaloids such as nicotine, nornicotine or an anabasine, which release the alkaloid readily, are desirable for contact insecticidal dusts or sprays, though of less value against many chewing insects, because of their more rapid loss of nicotine.

Where the alkaloid polysilicate compound is one which has the property of retaining the volatile alkaloid, or a reasonable proportion thereof, for a considerable time, even when exposed to the weather, it would form an excellent material for protecting a plant or fruit against chewing insects, were it not for certain disadvantages hereinafter explained.

In a spray insecticide for practically protecting plants or fruit against chewing insects, it is not only necessary to have a material which will retain its toxic properties for a considerable time, but it is also necessary to have a material which will readily form a complete coating on the plant or fruit and one which will remain long enough to protect the plant or fruit throughout the required period of insect attack, but which will eventually lose its poisonous properties and be thereafter readily washed off by rains or, in the case of fruit, by a simple washing process.

These various requirements are antagonistic to some extent, since on the one hand the coating must cling for a considerable time to the surface on which it is deposited and must retain its toxicity, and yet on the other hand, it must gradually lose its toxicity, so that at the end of a reasonable period, for example, one month, it is so weak as to be non-poisonous, and also becomes less adherent, at least, by harvest time.

It is the object of the present invention to provide an insecticidal spray, utilizing the toxic properties of such volatile alkaloids as nicotine, nornicotine, or anabasine, chemically combined with the alumino or ferro polysilicates by a base exchange reaction, which spray will insure a good coating, well covering the sprayed plant or fruit, firmly adherent thereto, and retaining its toxicity for, at least, a month, and then gradually losing its toxicity and disintegrating so as to be no longer adherent after that time.

A further object is to provide a combined contact and stomach poison spray, utilizing the alkaloid polysilicates hereinbefore referred to, which will provide a good coating on plants or fruit that will have a quick contact action by readily releasing a part of the volatile alkaloid, and also have an effective and persistent action as a stomach poison for a relatively long period due to its retention of another part of the volatile alkaloid, and thereafter will gradually lose its toxicity and disintegrate under the action of the weather so as to be readily removable.

Many attempts have been made heretofore to provide an insecticidal spray utilizing the combined properties of nicotine and certain naturally occurring complex alkali and alkaline earth salts of alumino-polysilicic acid, (in which, at times, some of the aluminum is replaced by trivalent iron). The naturally occurring minerals heretofore used have been some of those compounds often classified as bentonites (a term covering a wide range of greatly differing alumino and ferro-alumino-polysilicates), but, up to this time, the results have been unsatisfactory from the practical standpoint, due to the fact that a spray of such material produced a coating which, when applied to fruit, was either too persistent and could be removed only with difficulty at harvest, or was not persistent enough and, therefore, would not afford protection against the insects for a time long enough to justify the expense of spraying. Applicant has discovered that these two opposite results are due to the different methods of production of the alkaloid combination.

If, for example, the alumino-polysilicate and a salt of nicotine are brought into contact in the presence of a relatively large amount of water, as occurs when the mixing is done in the usual spray tank substantially filled with water, the result is the formation of a compound of nicotine with the alumino-polysilicate, whose physical properties are such that a glue-like, exceedingly persistent deposit is formed on the fruit, which cannot be easily wiped or washed off at harvest. On the other hand when the reaction with identical materials is brought about in the presence of a relatively small amount of water and the resultant product is then dried and ground (as in factory production) such ground material has lost its adhesive properties, and, hence, when mixed in a spray tank with water and sprayed on fruit, gives a powdery deposit which does not form a good coating and does not cling sufficiently long to protect the fruit against insects for any appreciable time.

Applicant has discovered, after a long series of laboratory and field tests, that so far as concerns the relative amount of nicotine retained on the foliage and fruit, when first applied, the factory made product, although forming a poor coating, is more toxic to newly hatched larvae than the tank-mixed product. This difference in toxicity appears to be connected in some way with the difference in physical nature of the respective spray deposit, that from the factory made product being powdery, while that from the tank-mixed product is glue-like.

Whatever the cause of this difference in toxicity, applicant has succeeded in providing an entirely satisfactory insecticidal spray, making use of the chemical combination, by base-exchange reaction, of a volatile alkaloid such as nicotine, nornicotine or anabasine, with an alumino or ferro polysilicate, in either of two ways. One way is to charge the spray tank with a composition of matter which contains some of the preformed chemical product made with a small amount of water, as hereinbefore referred to, (the so-called factory-made alkaloid-alumino or ferro-polysilicate) and which composition also contains some raw materials for the chemical production in the spray tank of further alkaloid-alumino or ferro-polysilicate, or alumino-ferro-polysilicate. The coating material thus obtained is excellent in that it has the desired high toxicity, has lost its objectionable glue-like characteristics and at the same time is not powdery, as is the usual factory-made product. It is entirely satisfactory when frequent applications of sprays are made at reasonable intervals of time. As, however, it is always advantageous to minimize the number of spray applications, for reasons of economy, applicant provides, in the composition, material which still further modifies the coating, using for this purpose a modifying agent having lubricating and adhesive properties, thereby obtaining a coating having the desired properties of high toxicity and persistency through sufficient time, coupled with ease of removal at harvest.

The modifying agent which applicant has discovered to be the most effective, when present in the coating material hereinbefore referred to, is a water-insoluble soap, that is to say, a water-insoluble fatty acid salt, produced in the spray tank at the same time with the production of some alkaloid-alumino or ferro-polysilicate, or so immediately thereafter as to be substantially simultaneous. Applicant has discovered that many alkaline earth and heavy metal salts of fatty acids are effective, as, for example, the calcium, magnesium, iron, aluminum, zinc and copper oleates and stearates, or palmitates, or any of these metals in combination with a mixture of fatty acids such as occur in the ordinary neutral soap of commerce. While a preformed water-insoluble soap when added to the materials, hereinbefore referred to, in the spray tank, when added at the time of reacting the nicotine and alumino-polysilicates, produces good results, applicant has found there is great improvement in the coating deposit from the spray if the water-insoluble soap is chemically formed at the same time as the alkaloid alumino or ferro silicate compound or immediately thereafter.

In some cases, a further desirable modification is obtained by including a small amount of a material having oily or greasy characteristics such, for example, as petroleum lubricating oil, soya bean oil, or even free oleic acid.

Applicant has also found further that the modifying agent, such as the water-insoluble soap, so modifies the tank-formed alkaloid-alumino or ferro-silicate, that the insecticidal coating resulting from the use of such a spray has physical properties somewhat resembling the spray resulting from the use in the spray tank of the preformed or factory made alkaloid-alumino or ferro-silicate, since it has lost its glue-like characteristics and retains the high toxicity which is desired. At the same time, it is not so powdery and, hence, will remain on the plant or fruit for a reasonable time. Such a coating is quite satisfactory under average weather conditions. Hence, a second way of obtaining a satisfactory coating is to provide a composition which will comprise the raw materials for reacting to form the tank-made alkaloid alumino-polysilicate and simultaneously therewith the insoluble fatty acid salt.

As explained hereinbefore, the water-insoluble soap may be preformed and added to the reactive materials for producing the alkaloid-polysilicates, but a great advantage is obtained, where the base-exchange reaction between the alkaloid and the complex alkali or alkaline earth salt of the alumino or ferro silicate is carried out simultaneously and in the same vessel with the formation of the water-insoluble fatty acid salt (or at least that the two reactions follow each other quickly) and in the presence of a large amount of water relative to the combined amount of reacting materials. Stated in another way, the alkaloid polysilicate compound and the water-insoluble fatty acid salt should be formed substantially simultaneously and in dilute solution so that one coats the other, or at least is very intimately mixed therewith.

It will be understood from the explanation so far given that the base-exchange reaction depended upon for the production of the alkaloid polysilicate chemical combination is characteristic of many polysilicates, such as a number of the so-called bentonites, the substances known as zeolites, greensand, and some artificial products called synthetic zeolites. Since, however, there is considerable difference in the permanency of the union of the alkaloid with the various materials named, the polysilicate selected as a starting material for the production of a stomach poison should be one which will retain the alkaloid in chemical combination for at least a month. Where, however, the insecticide spray is intended to be lethal against sucking insects, which requires that the volatile alkaloid be set free relatively easy, at least some of the polysilicates which release the alkaloid more readily may be mixed with the polysilicates forming the permanent alkaloid combination, to form a mixed polysilicate starting material to be reacted with the volatile alkaloid, or by having present with the permanent polysilicates a small amount of free ammonia to provide a selective alkalinity.

Applicant has discovered that for the production of the best possible stomach poison spray for use against chewing insects, an alumino-polysilicate whose formula includes a substantial proportion of the group $3(Al_2O_3)15(SiO_2)$ or the group $3(Al_2O_3)18(SiO_2)$ should be used, it being understood, of course, that the $Al_2O_3$ may be replaced wholly or in part by the $Fe_2O_3$ and that the formula must also include some alkali or alkaline earth metals. Starting materials coming under the formula mentioned above are supposed to have all bonds of the alumina saturated and no replaceable base is connected to it, but only to the silica. Hence, the alkaloid, by base exchange, connects only to the silica, and, as a result is held strongly, whereas in those polysilicates where the alumina is not saturated, the alkaloid may connect, at least in part, to the alumina and is thereafter readily released. Whether this is the true explanation or not, the fact is that polysilicates coming under either of the two formulae specified have been found to produce much more satisfactory and durable alkaloid polysilicate compounds for stomach poisons, only, than those outside said formula.

Among the many minerals which are suitable for applicant's purpose for the preparation of a spray-insecticide for the protection of plants against chewing insects, those most efficient, for stomach poisons, only, are certain Wyoming polysilicates known as Wyoming bentonites, which are penta silicates, and some California polysilicates which are hexa silicates, the terms penta and hexa indicating the ratio of the number of groups of $SiO_2$ to those of $Al_2O_3$ in the formula for the respective polysilicates. Where the material to be applied to plants or fruit is to be suitable as both a strong contact insecticide and also a persistent stomach poison, the alumino or ferro polysilicates having replaceable bases attached to both the alumina and also the silica radicals are suitable, and such polysilicates are those in which the ratio of $SiO_2$ to $Al_2O_3$ is other than 5 or 6. However, by employing a small amount of free ammonia in the spray solution, the penta and hexa silicates, above referred to, may be used to form a spray coating which serves as a combined contact and stomach insecticide, the proportion of free ammonia determining the extent to which the volatile alkaloid will be quickly released.

In carrying out the invention in practice to produce a spray which is predominantly a stomach poison, for protection of plant matter against chewing insects, the so-called Wyoming bentonites now known on the market as Volclay and Wilkinite are representative of the particular alumino, or alumino-ferro, polysilicates, which applicant intends under the designation Wyoming bentonite, while of the so-called California bentonites, those now known on the market as Filtrol and "Stay-up" are representative of the material intended by applicant under the term California bentonites. The said Wyoming and the California "Stay-up" bentonites are of the "swelling" type, while the California Filtrol bentonite is nonswelling.

It is to be understood, of course, that the materials as found in nature are accompanied by varying percentages of impurities, which, however in the materials on the market do not injuriously affect the final products manufactured under applicant's invention. There may be some slight adsorption of the volatile alkaloid by the impurities, or some of them, and this adsorbed alkaloid, may be released at once on striking the plant and the beginning of evaporation of the water. The quickly escaping volatile alkaloid will serve as a contact insecticide and, therefore, may be beneficial for that purpose though, of course, useless as a durable protection against chewing insects. Generally, however, the contact action resulting from adsorption is relatively small on account of the small amount of the impurities.

As illustrative of the particular manner of carrying out the invention, applicant submits the following specific examples, which have given highly satisfactory results.

*Example No. 1.*—92 pounds of Wyoming bentonite are ground with 8 pounds of crystalline magnesium sulphate. This operation serves the dual purpose of dispersing the magnesium sulphate throughout the bentonite and of making this type of bentonite readily wettable. 4 pounds of this mixture are suspended in about fifty gallons of water by agitation with a paddle or otherwise. While continuing the agitation 1.2 pounds of nicotine oleate, containing 33% nicotine and about 65% oleic acid, are gradually poured in. Water is now added to bring the total to 100 gallons. If the operation is carried out in a spray tank the material may now be sprayed on trees, while continuing the agitation. What is sprayed is essentially an intimate association of nicotine bentonite and magnesium oleate suspended in water.

*Example No. 2.*—60 pounds of pulverulent Wyoming bentonite are mixed, not ground, with 30 pounds of dry, powdered, neutral, sodium soap and 10 pounds of plaster of Paris. 6 pounds of this mixture are added to 50 gallons of water containing 1 pound of nicotine sulphate, of 40% nicotine strength, the whole mixture being agitated a few minutes, for example, 5 minutes, and then made up to 100 gallons, by the addition of more water, whereupon it is ready to be applied as an insecticide spray. In this case, the spray consists essentially of nicotine bentonite associated with an insoluble calcium soap.

*Example No. 3.*—88 pounds of Wyoming, or California "Stay-up," bentonite are mixed or ground with 12 pounds of plaster of Paris. 4 or 5 pounds of this mixture are suspended in 20 to 80 gallons of water, and then there is poured in about 1½ pints of a liquid mixture consisting of 31 parts anhydrous nicotine (98% nicotine), 58 parts commercial oleic acid (red oil) and 11 parts soya bean oil. The whole mixture is agitated a few minutes and, while stirring, water is added to bring the total to 100 gallons, whereupon it is ready to be applied as a spray. In this case the soya bean oil further modifies the spray deposit, and makes it more readily removable from certain kinds of fruit, such as apples.

In any of the above three examples, the non-swelling type of bentonite, such as the California bentonite known as "Filtrol," may be substituted for a portion of the Wyoming bentonite, which is the swelling type, if it is desired that the spray deposit be less adhesive. If it is desired to have sulphur present in the spray to act as a fungicide, "bentonite-sulphur" such as the material on the market known as "Kolofog," may be substituted in whole or in part for the Wyoming bentonite in the above three examples. In this latter case, the amounts used would be changed to correspond with the amount of bentonite in the "bentonite-sulphur."

In Examples Nos. 1 and 3, a water solution of anabasine or nornicotine oleate may be substituted in proportionate amount for the nicotine oleate; and in Example No. 2 a 40% anabasine or nornicotine sulphate may be directly substituted for the nicotine sulphate.

The above three examples are of the type known as tank-made sprays, which are made and used at about the time of spraying. Since, however, it is generally more convenient to prepare in advance a composition of dry materials which need only be added to the water in the tank and agitated for a few minutes prior to spraying, applicant has devised a number of such dry compositions which can be made accurately under factory conditions, and may be stored and transported without deterioration in usual course of handling and storing. Some examples of these compositions, which are highly satisfactory are given herein below. In the first of the following examples (No. 4) the material called factory-made nicotine bentonite refers to the product made by combining a Wyoming bentonite, of the kind hereinbefore referred to, with nicotine sulphate and a very small amount of water, drying the product and grinding it. Such a product will contain chemically bound nicotine, the percentage chemically combined varying by steps, according to the amount of replacement of the alkali or alkaline earth molecules by the nicotine, this amount of replacement varying with the concentration of the nicotine and the time allowed for the reaction. It is possible to obtain as high as 8 percent nicotine.

In Example No. 5 there is an excess of nicotine to the extent of about 6 percent above that chemically combined, this excess being merely adsorbed by the bentonite, and constituting the nicotine which reacts in the tank, with the additional raw bentonite.

The examples of the best compositions now known to applicant are as follows:

*Example No. 4.*—A dry, mechanical mixture of the following composition may be put in a single package:

| | Parts |
|---|---|
| "Factory made" nicotine bentonite—8% nicotine | 50 |
| Powdered sodium oleate | 18 |
| Nicotine-zinc hydrochloride—47% nicotine | 9 |
| Dry Wyoming bentonite | 23 |
| Total—approximately 8% nicotine | 100 |

5 pounds of the above mixture are agitated with 25 to 75 gallons of water for a few minutes and made to 100 gallons. In this case, the double salt of nicotine and zinc serves the dual purpose of furnishing the nicotine to form the nicotine bentonite and the zinc to form the insoluble soap, zinc oleate.

*Example No. 5.*—A "factory-made" nicotine bentonite is made to contain 14% actual nicotine, by treating the bentonite with an excess of nicotine sulphate, drying and grinding it. At this percentage of nicotine about half of the total nicotine is water soluble, as nicotine sulphate. A dry, mechanical mixture may then be made of the following composition:

| | Parts |
|---|---|
| "Factory-made" nicotine bentonite—14% nicotine | 57 |
| Powdered neutral laundry soap | 18 |
| Plaster of Paris | 6 |
| Dry Wyoming bentonite | 19 |
| Total—approximately 8% nicotine | 100 |

The above is quite similar to Example No. 4 except the zinc soap, which is sometimes injurious to plants, is replaced by a calcium soap. 5 pounds of this mixture are used to 100 gallons of water to form the spray.

*Example No. 6.*—A dry, mechanical mixture of the following composition:

| | Parts |
|---|---|
| "Factory-made" nicotine bentonite—14% nicotine | 37 |
| Powdered neutral laundry soap | 11 |
| Hydrated lime | 1 |
| Tobacco dust | 12 |
| Ammonium sulphate | 3 |
| Dry Wyoming bentonite | 36 |
| Total—approximately 5% nicotine | 100 |

8 pounds of this mixture are used to 100 gallons of water. In this case, a series of chemical reactions take place in the spray tank and as the spray drys on fruit and foliage, as follows: The hydrated lime reacts with the ammonium sulphate to liberate ammonia, which in turn liberates some nicotine, so that, as the spray goes on, it is alkaline and therefore has more contact effect. However, as the spray film drys, the nicotine tends to replace the ammonia which being the more volatile of the two escapes into the air. Both the tobacco dust and the lime furnish calcium to form the insoluble soap, which is one of the end products sought, the other being nicotine bentonite. The tobacco dust also acts to further modify the final spray deposit to a powdery, easily removable coating.

A "factory-made" anabasine bentonite or nornicotine bentonite, containing about 14% of the alkaloid, may be substituted for the "factory-made" nicotine bentonite in Examples 5 and 6.

*Example No. 7.*—A further composition which will give excellent results is as follows:

| | Parts |
|---|---|
| "Factory-made" nicotine-bentonite, 14% nicotine | 72 |
| Powdered neutral laundry soap | 15 |
| Hydrated lime | 2 |
| Ammonium sulphate | 3½ |
| Dry Wyoming bentonite | 7½ |
| Total, approximately 10% nicotine | 100 |

This composition may be put up in package form and is ready for use in making a liquid spray. It may be added to water in the proportion of four pounds of the composition to 100 gallons of water, while agitating. The hydrated lime and ammonium sulphate react to give free ammonia which causes some of the nicotine to be set free and thereby serve as an immediately acting contact insecticide. An important feature of this invention is that after the spray is deposited on a plant, as the water evaporates the free ammonia evaporates ahead of the nicotine, and the remainder of the latter reenters into chemical combination with the bentonite, and serves as a stomach poison. The amount of free ammonia to be developed may be adjusted by some variation of the proportions of free ammonia-producing ingredients so as to adjust the amount of contact nicotine, or similar volatile parasiticidal compound which will be available at the time the spray strikes a plant.

It will be apparent from the above that due to this selective solubility of the alkaloid employed, such as nicotine, nornicotine and anabasine, an immediate contact effect is obtained by the introduction of free ammonia, or the necessary reactive materials for producing it in the spray solution, such as, for example, the lime and ammonium sulphate employed in the above formula.

Where in addition to the water-insoluble fatty acid salt there is to be added an additional lubricant material such as petroleum oil, soya bean oil, or free oleic acid, the said additional lubricant material may be employed in a relatively small proportion, for example, so as to constitute less than one-half of one percent by weight of the final aqueous spray ready for use, and in practice very satisfactory results are attained by employing only about one-fifth of one percent by weight of the said additional lubricant in the final aqueous spray.

It is to be noted that a great advantage of the invention in some of its embodiments is that a selective, or predetermined, adhesion of the spray deposit is obtained by adding to the tank-reacted alkaloid bentonite, made from the swelling type of bentonite, some factory-made alkaloid bentonite, in the desired proportion to give the desired adhesion. Also this selective adhesion may be attained by the use of the proper portion of the insoluble fatty acid salt. In the best embodiment of the invention both methods of adjusting the adhesion of the spray deposit may be employed simultaneously.

Furthermore, in using the tank-reacted alkaloid bentonite hereinbefore disclosed, the selective adhesion can be obtained by using some non-swelling type of bentonite with some of the swelling type, the proportions being adjusted as desired, according to the type of spray deposit which is wanted. This mixture of the two types of bentonites may also be used with some insoluble fatty acid salt of the kind herein described.

A further great advantage of the invention is that there may be added to the spray a considerable additional amount of petroleum oil or emulsion, not only as a lubricant but for its contact effect. When such additional petroleum oil or emulsion is used with any of the combinations containing an insoluble fatty acid salt, there is obtained a water-in-oil type of emulsion, which wets the alkaloid bentonite, and when such a spray strikes a plant, the oil clings and spreads on the foliage and fruit, while the water in the spray can run off without appreciable loss of the volatile alkaloid.

Good results are obtained by adding ½ gallon to 1 gallon of the type of petroleum known as summer spray petroleum oil, to the tank, when making a liquid spray, the said oil being the final ingredient, then agitating for a few minutes before making up the spray with water to 100 gallons. This use of additional oil is very satisfactory with any of the compositions set forth as Examples 1 to 7.

A further illustration of a spray composition employing oil, is as follows:

*Example No. 8.*—2 quarts of a solution of anhydrous nicotine oleate in summer spray petroleum oil in amount to make 5% nicotine are added to 25 to 50 gallons of water in a spray tank, and agitated for a few minutes. This forms the usual type of oil-in-water emulsion, the nicotine oleate being the emulsifying agent; 3 pounds of Wyoming bentonite containing 5% of calcium sulphate are now poured into the tank and the agitation continued while filling the tank to 100 gallons. The reactions which take place produce calcium oleate and nicotine bentonite; the former reverses the emulsion, and the end product is a suspension of a mixture of nicotine bentonite and calcium oleate coated with oil. In this example the nicotine is in a reduced strength, but sufficient for the desired purposes.

What is claimed is:

1. A parasiticidal composition for making a spray, comprising the solid reaction products obtained by reacting a base-exchange polysilicate comprising a complex polysilicate of metal in trivalent form included in the group aluminum, iron, and of metal of lesser valency replaceable by an alkaloid of the group, anabasine, nornicotine, nicotine, with the salt of such an alkaloid, in the presence of a relatively limited amount of water, and drying, said solid reaction products being admixed with dry, unreacted, raw materials for the production of the same class of reaction products as above named, when the composition is added to water.

2. The process of making a parasiticidal composition which comprises reacting a base-exchange polysilicate comprising a complex polysilicate of metal in trivalent form included in the group aluminum, iron, and of metal of lesser valency replaceable by an alkaloid of the group, anabasine, nornicotine, nicotine, with a salt of such an alkaloid, in the presence of a relatively limited amount of water, drying the resultant product, mixing therewith a complex polysilicate, in dry form, of trivalent metal and of metal of lesser valency replaceable by an alkaloid of the class above named and also mixing therewith a salt, in dry form, of an alkaloid of the class above named, and thereafter adding the above mixed products gradually to a relatively large amount of water, whereby the said dry salt of the alkaloid and the last named dry polysilicate react.

3. The process of making a parasiticidal composition, which consists in adding to a body of water, materials which will react to produce a base-exchange polysilicate comprising a complex polysilicate of metal in trivalent form included in the group aluminum, iron, having, in combined form, an alkaloid of the group, anabasine, nornicotine, nicotine, and substantially simultaneously adding a soluble salt of a fatty acid included in the group oleic, stearic, palmitic, and a soluble salt of metal selected from the group calcium, magnesium, iron, aluminum, zinc, and copper and capable of reacting with such fatty acid salt.

4. A parasiticidal spray composition comprising the reaction products of a water-solution of a salt of an alkaloid, selected from the group, anabasine, nornicotine, nicotine, and a base-exchange polysilicate comprising a complex salt of a polysilicate of metal in trivalent form included in the group aluminum, iron, and of metal of lesser valency replaceable by alkaloid of the class above named, intimately commingled with the simultaneously produced reaction products of a soluble fatty acid salt and a soluble salt of metal selected from the group calcium, magnesium, iron, aluminum, zinc, copper.

5. A parasiticidal spray composition comprising the reaction products of a water-solution of a salt of an alkaloid, selected from the group, anabasine, nornicotine, nicotine, and a base-exchange polysilicate comprising a complex salt of a polysilicate of metal in trivalent form included in the group aluminum, iron, and of metal of lesser valency replaceable by alkaloid of the class above named, intimately commingled with the simultaneously produced reaction products of a soluble fatty acid salt and a soluble salt of metal selected from the group calcium, magnesium, iron, aluminum, zinc, copper, said spray composition also containing lubricant material in amount varying from one-tenth to about one percent by weight of the total spray composition.

6. A parasiticidal spray composition comprising the product obtained by the substantially simultaneous production in each other's presence of two sets of reaction products, namely, first, the reaction products of a water-solution of a salt of an alkaloid, selected from the group, anabasine, nornicotine, nicotine, and a base-exchange polysilicate comprising a complex salt of a polysilicate of metal in trivalent form included in the group aluminum, iron, and of metal of lesser valency replaceable by alkaloid of the class above named, and, second, the reaction products of a soluble fatty acid salt and a soluble salt of metal, selected from the group calcium, magnesium, iron, aluminum, zinc, copper, and capable of reacting with said fatty acid salt.

7. A parasiticidal spray composition comprising the product obtained by the substantially simultaneous production in each other's presence of two sets of reaction products, namely, first, the reaction products of a water-solution of a salt of an alkaloid, selected from the group, anabasine, nornicotine, nicotine, and a base-exchange polysilicate comprising a complex salt of a polysilicate of metal in trivalent form included in the group aluminum, iron, and of metal of lesser valency replaceable by alkaloid of the class above named, and, second, the reaction products of a soluble fatty acid salt and a soluble salt of metal, selected from the group calcium, magnesium, iron, aluminum, zinc, copper, and capable of reacting with said fatty acid salt, said spray composition also containing lubricant material in amount varying from one-tenth to five-tenths of one percent by weight of the total spray composition.

8. A dry parasiticidal composition of matter consisting of 50 parts of a preformed compound consisting of a base-exchange polysilicate comprising a complex polysilicate of metal in trivalent form included in the group aluminum, iron, said polysilicate also being in chemical combination with nicotine, said compound carrying about 14 percent actual nicotine a part of which is chemically uncombined with said polysilicate; 18 parts of powdered neutral laundry soap; 6 parts plaster of Paris; and 19 parts of a dry complex polysilicate of a trivalent metal and of a metal of lesser valency replaceable by nicotine.

9. A dry parasiticidal composition of matter consisting of a base-exchange polysilicate comprising a complex polysilicate of metal in trivalent form included in the group aluminum, iron, said polysilicate also being in chemical combination with nicotine, said compound carrying about 14 percent actual nicotine a part of which is chemically uncombined; 11 parts powdered neutral laundry soap; 1 part hydrated lime; 12 parts tobacco dust; 3 parts ammonium sulphate; and 36 parts of a dry base-exchange polysilicate comprising a complex polysilicate of a metal in trivalent form included in the group aluminum, iron, and of a metal of lesser valency replaceable by nicotine.

10. A dry parasiticidal composition of matter consisting of 50 parts of a preformed compound consisting of a base-exchange polysilicate comprising a complex polysilicate of metal in trivalent form included in the group aluminum, iron, said polysilicate being in chemical combination with nicotine, said compound having a nicotine strength of about 3.77 percent; 18 parts of powdered sodium oleate; 9 parts of nicotine-zinc hydrochloride, having a nicotine strength of about 47 percent; and 23 parts of a dry base-exchange polysilicate comprising a complex polysilicate of metal in trivalent form included in the group aluminum, iron, and of a metal of lesser valency replaceable by nicotine.

11. A tank-mixed liquid parasiticidal spray consisting of the reaction products obtained by mixing about 3.52 to 4.40 pounds of a base-exchange polysilicate comprising a complex polysilicate of metal in trivalent form included in the group aluminum, iron, and of a metal of lesser valency, with about 0.48 to 0.60 pound of calcium sulphate, with about 1½ pints of a liquid comprising 31 percent anhydrous nicotine of 98 percent nicotine strength, 58 percent commercial oleic acid, 11 percent soya bean oil, and with about 100 gallons of water.

12. A tank-mixed liquid parasiticidal spray consisting of the reaction products obtained by combining about 3.68 pounds of a base-exchange polysilicate comprising a complex polysilicate of metal in trivalent form included in the group aluminum, iron, and of a metal of lesser valency, with about 0.32 pound of magnesium sulphate, about 1.2 pounds of nicotine oleate containing 33 percent nicotine, and about 100 gallons of water, the essential active elements of said spray comprising a suspension of a complex polysilicate of metal in trivalent form in chemical combination with nicotine, intimately associated with magnesium oleate.

13. A tank-mixed liquid parasiticidal spray consisting of the reaction products obtained by combining about 3.6 pounds of a base-exchange polysilicate comprising a complex polysilicate of metal in trivalent form included in the group aluminum, iron, and of a metal of lesser valency, with about 1.8 pounds of dry, powdered, neutral sodium soap, about 0.6 pound of calcium sulphate, about 1 pound of nicotine sulphate of 40 percent nicotine strength, and about 100 gallons of water, the essential active ingredients of said spray comprising a suspension of a complex polysilicate of metal in trivalent form in chemical combination with nicotine.

14. A parasiticidal spray composition comprising the reaction products of a water-solution of a salt of an alkaloid, selected from the group, anabasine, nornicotine, nicotine, and a base-exchange polysilicate comprising a complex salt of a polysilicate of metal in trivalent form included in the group aluminum, iron, and of metal of lesser valency replaceable by alkaloid of the class above named, intimately commingled with the reaction products of a soluble fatty acid salt and a soluble salt of metal selected from the group calcium, magnesium, iron, aluminum, zinc, copper, in combination with an ammonium salt which will evolve free ammonia, when said composition is added to water.

ROBERT B. ARNOLD.